United States Patent
Kube (10) Patent No.: US 10,374,525 B2
(45) Date of Patent: Aug. 6, 2019

(54) MULTIPLE DRIVE FOR A HEAVY-LOAD APPLICATION AND METHOD FOR OPERATING SUCH A MULTIPLE DRIVE

(71) Applicant: SIEMENS AKTIENGESELLSCHAFT, München (DE)

(72) Inventor: Andreas Kube, Aachen (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 15/528,306

(22) PCT Filed: Nov. 17, 2015

(86) PCT No.: PCT/EP2015/076798
§ 371 (c)(1),
(2) Date: May 19, 2017

(87) PCT Pub. No.: WO2016/079107
PCT Pub. Date: May 26, 2016

(65) Prior Publication Data
US 2017/0366111 A1    Dec. 21, 2017

(30) Foreign Application Priority Data

Nov. 21, 2014 (EP) .................................. 14194334

(51) Int. Cl.
| | |
|---|---|
| *G05B 19/19* | (2006.01) |
| *H02P 1/58* | (2006.01) |
| *B02C 15/00* | (2006.01) |
| *B02C 25/00* | (2006.01) |

(Continued)

(52) U.S. Cl.
CPC .............. *H02P 1/58* (2013.01); *B02C 15/006* (2013.01); *B02C 25/00* (2013.01); *H02P 29/60* (2016.02); *H02P 29/68* (2016.02)

(58) Field of Classification Search
CPC ......... B02C 15/006; B02C 25/00; H02P 1/58; H02P 29/60; H02P 29/68
See application file for complete search history.

(56) References Cited

U.S. PATENT DOCUMENTS

| | | | | |
|---|---|---|---|---|
| 5,241,250 A | * | 8/1993 | Nagasawa | G05B 19/4141 318/53 |
| 5,569,986 A | * | 10/1996 | Erwin | D01H 1/32 318/34 |
| 2010/0282883 A1 | | 11/2010 | Dixon et al. | |

(Continued)

FOREIGN PATENT DOCUMENTS

| | | |
|---|---|---|
| CN | 101888903 A | 11/2010 |
| CN | 103826749 A | 5/2014 |

(Continued)

*Primary Examiner* — Muhammad S Islam
(74) *Attorney, Agent, or Firm* — Henry M. Feiereisen LLC (57) ABSTRACT

A multiple drive for a heavy load application includes a plurality of drive trains which are activated such that individual ones of the plurality of drive trains are successively activated automatically during startup of the heavy load application as part of a predefined activation strategy according to a predefined activation scheme and an activation sequence defined therein. In the event of a repeated start of the heavy-load application, a different activation scheme can be used for the activation.

13 Claims, 3 Drawing Sheets

(51) Int. Cl.
*H02P 29/60* (2016.01)
*H02P 29/68* (2016.01)

(56) References Cited

U.S. PATENT DOCUMENTS

| | | |
|---|---|---|
| 2013/0001341 A1 | 1/2013 | Lessard |
| 2015/0336106 A1 | 11/2015 | Klotzek et al. |
| 2015/0336107 A1 | 11/2015 | Kube |
| 2015/0349697 A1 | 12/2015 | Kube |
| 2015/0367353 A1 | 12/2015 | Kube |
| 2016/0023218 A1 | 1/2016 | Kube |

FOREIGN PATENT DOCUMENTS

| | | |
|---|---|---|
| DE | 10 2007 033 256 | 1/2009 |
| DE | 10 2011 079 555 A1 | 1/2013 |
| DE | 102011079555 A1 | 1/2013 |
| EP | 0 680 136 A1 | 11/1995 |
| EP | 1 770 852 A1 | 4/2007 |
| EP | 2 083 513 A1 | 7/2009 |
| WO | WO 2014/020079 A2 | 2/2014 |

* cited by examiner

MULTIPLE DRIVE FOR A HEAVY-LOAD APPLICATION AND METHOD FOR OPERATING SUCH A MULTIPLE DRIVE

CROSS-REFERENCES TO RELATED APPLICATIONS

This application is the U.S. National Stage of International Application No. PCT/EP2015/076798, filed Nov. 17, 2015, which designated the United States and has been published as International Publication No. WO 2016/079107 and which claims the priority of European Patent Application, Serial No. 14194334.0, filed Nov. 21, 2014, pursuant to 35 U.S.C. 119(a)-(d).

BACKGROUND OF THE INVENTION

The invention relates to a multiple drive for a heavy load application, i.e. a multiple drive for a vertical mill for cement production or similar, for example, and to method for operating such a multiple drive.

DE 10 2011 079 555 A1 discloses a drive arrangement for a vertical roller mill comprising a plurality of electric motors over which the total drive load is evenly distributed during operation. EP 1 770 852 A discloses a method for starting up a production machine, wherein startup is effected by means of a hydraulic motor and continuous operation takes place by means of an electric motor. EP 0 680 136 A discloses a method for soft-starting the drive motors of a rotor spinning machine. These each independently drive individual operating elements of the machine, e.g. a main suction system, a tailstock rotor, a headstock rotor, and opening rollers. Under the control of a soft-start controller, the drive motors are supplied with a base voltage during a predefined run-up time and thereafter with a line voltage, and the soft-start controller specifies the run-up sequences of the individual motors.

In the case of drives for vertical mills without frequency converters, starting aids are used for the startup process. Starting aids are to be understood here as meaning, for example, liquid starters, soft starters and also fluid couplings. The purpose of such starting aids is to adjust the starting torque produced, and the starting current occurring, to a desirable level. The startup process places a particular load on the drive, resulting, among other things, in excessive heating of drive components such as a starter or fluid coupling. An undesirable cooling time is often inevitable if several startup attempts are required or the drive components in question are heated for other reasons.

SUMMARY OF THE INVENTION

An object of the present invention is accordingly to specify a drive for a heavy load application, in particular a heavy load application in the form of a vertical mill, and a method for operating such a drive, whereby such waiting times are avoided or at least significantly reduced.

This object is inventively achieved in respect of the drive by means of a multiple drive having the features as claimed in the independent device claim and in respect of a corresponding method for operating such a drive having the features as claimed in the parallel, independent method claim.

For the multiple drive proposed here and acting as a drive for a heavy load application, in particular a multiple drive for a vertical mill, wherein the multiple drive comprises a plurality of drive trains, it is provided that, for starting up the heavy load application/vertical mill, individual drive trains can be successively activated, in particular activated and deactivated, automatically as part of a predefined activation strategy.

For the corresponding method for operating a multiple drive acting as a drive for a heavy load application, in particular a vertical mill of the type used or suitable for use in the cement industry, and comprising a plurality of drive trains, it is provided that, when starting up the heavy load application, individual drive trains are successively activated automatically as part of a predefined activation strategy, in particular that, at startup, individual drive trains are activated and other drive trains are deactivated and/or during operation individual drive trains are deactivated whereas other drive trains are activated.

Individual drive trains are successively activated according to a predefined or predefinable activation scheme and an activation sequence defined therein, or depending on a state, e.g. a temperature, of the individual drive trains. Also in the event of any repeated startup necessary, such activation schemes are used or states taken into account automatically, e.g. by using different activation schemes in each case for repeated startup, such that, for example, during repeated startup, the drive train having the lowest temperature is activated first in each case. At startup, such successive activation of individual drive trains ensures that the drive trains comprised by the multiple drive are used evenly and with low wear. During any required repeated startup of the heavy load application, the automatic use of different activation schemes or the automatic selection of the drive train to be activated first in each case according to a particular state of the drive train ensures that the new startup process can be initiated immediately and no waiting time is required e.g. to allow the drive train to cool down. In addition, the resulting use of different initially activated drive trains in each case likewise ensures even and low-wear use of the drive trains comprised by the multiple drive.

A particular advantage of using a multiple drive and successive activation/activatability of the drive trains comprised thereby is that the starting current resulting from startup of the heavy load application on the basis of successive activation of the drive trains remains significantly below the starting current that would be produced using a single drive or activating all the drive trains of a multiple drive simultaneously. In addition, for the power ranges required for heavy load applications, a multiple drive comprising a plurality of drive trains each having a motor and without upstream converter is significantly less expensive than a "large" individual drive having an upstream converter or a multiple drive having respective upstream converters.

The above mentioned object is also achieved by means of a control device for controlling a multiple drive of a heavy load application, said device operating in accordance with the method described here and in the following and, to this end, comprising means for carrying out the method. The control device accordingly incorporates an implementation of the respective activation strategy and acts as a means of applying the activation strategy and thus as a means of successively activating individual drive trains or a plurality of drive trains automatically during startup of the respective heavy load application. This means that the invention is preferably implemented in software. The invention is therefore on the one hand a computer program, namely a control program executable/executed by means of the control device and containing computer executable program code instructions, and on the other hand a storage medium containing such a computer/control program, i.e. a computer program product having program code means. The invention is therefore also a control device or a drive system into the memory of which such a computer program is or can be loaded as a means of carrying out the invention and its embodiments.

The control program is an implementation of said method in software. Instead of a control program having individual program code instructions, the method described here and in the following can also be implemented in the form of firmware. It will be obvious to persons skilled in the art that instead of an implementation of the method in software, an implementation in firmware or in firmware and software or in firmware and hardware is always also possible. For the description presented here, it should therefore be understood that the term software or the terms control program and computer program also encompass other implementation possibilities, namely in particular an implementation in firmware or in firmware and software or in firmware and hardware.

The invention is therefore lastly also a heavy load application, in particular a heavy load application in the form of a vertical mill, comprising a multiple drive, said multiple drive comprising drive trains which can be successively activated individually or in groups for starting up the heavy load application, and a control device of the type described above.

Advantageous embodiments of the invention are set forth in the sub-claims. Back-references used in the sub-claims relate to further refinements of the subject matter of the main claim by virtue of the features of the particular sub-claim. They are not to be understood as a waiver of the right to independent, objective protection for the combination of features of the sub-claims to which they refer. In addition, having regard to an interpretation of the claims in the case of a more detailed concretization of a feature in a subordinate claim, it is to be assumed that such a restriction does not exist in the respective preceding claims. Lastly it must be pointed out that the multiple drive can also be further developed according to the dependent method claims, e.g. in that the multiple drive or a control device provided for the control thereof comprises means of executing the respective method steps, and vice versa.

In an embodiment of the multiple drive it is provided that the drive trains comprise a motor but no (main) converter connected upstream and continuously active during operation of the multiple drive. In the case of such a multiple drive which can manage without expensive converters, and which would cause a considerable load to be placed on the electrical supply system in the event of simultaneous activation of all the drive trains, the successive automatic activation of individual drive trains or individual groups of drive trains as part of a predefined activation strategy is particularly useful.

In another embodiment of the multiple drive it is provided that the drive trains comprise a motor and a coupling, namely a coupling in the form of a fluid coupling. The advantage of a fluid coupling is that the respective motor can accelerate to nominal speed within a short time without the driven heavy load application being equally accelerated along with it, as the fluid coupling obviously allows slippage.

In another embodiment of a multiple drive comprising drive trains having a fluid coupling it is provided that an individual drive train can be activated by acting upon the fluid coupling. For example, an activation strategy is then possible whereby individual motors of the drive trains or groups of motors initially start up under no load and then individual drive trains or groups of drive trains are activated by acting upon the respective fluid coupling thereof, namely by action in the form of varying the fill level of the respective fluid coupling. By means of the successive and at least initially no-load or largely no-load startup of the or each motor initially started as part of the startup strategy, the initial power requirement compared to a power requirement hitherto arising for starting up a heavy load application as well as the thermal stress of the drive components remain small. With a plurality of fluid couplings being filled simultaneously, a large starting torque is developed, whereby startup of the heavy load application is simply achieved and no component is excessively stressed. With selective filling of particular fluid couplings, the thermal stress as a result of the starting process can be avoided for the other fluid couplings.

In an embodiment of the method, at startup of the heavy load application only one of the drive trains or one group of drive trains is initially activated as part of the successive activation of individual drive trains, and the heavy load application is brought to a predefined or predefinable speed, e.g. an idling speed, by means of the one activated drive train or activated group of drive trains. When the respective speed (initial speed) is attained, all the drive trains or further drive trains are activated. The initial activation of a single drive train or group of drive trains limits the initial starting current. Should it be necessary to restart the heavy load application, at the next startup process another drive train or another group of drive trains from the drive trains comprised by the multiple drive can be selected for the initial activation. As a result, a drive train used for the previous startup process, and becoming hot in the process, is not re-used for the subsequent startup process or is at least assisted by a drive train not used in the previous startup process.

Instead of formulations such as "drive train or group of drive trains", reference will often also be made here and in the following, but without prejudice to further generality, only to a drive train. This is based on the understanding underlying the further description that the term "drive train" at least in some cases also describes a grouping of the unit comprised by the multiple drive, wherein in respect of the functionality described here it is irrelevant whether the drive train denotes a single motor with or without downstream gearbox or a plurality of motors with or without downstream gearbox in each case.

For the interpretation of the description presented here, activation of a drive train is basically to be understood as supplying current to a motor (electric motor) incorporated therein. It is additionally or alternatively conceivable for a coupling between a motor incorporated in the drive train and a gearbox likewise incorporated in the drive train and driven by the motor to be acted upon in order to activate a respective drive train. In the case of a fluid coupling having a variable fill level, such action can consist, for example, of the fill level being varied in terms of a changed linkage of the motor.

In addition, it is pointed out that the multiple drive described here and in the following acts as the main drive of the heavy load application, wherein a particularly preferred embodiment consists in that the multiple drive acts as the sole drive of the heavy load application and accordingly no secondary drive or similar, e.g. a secondary drive according to DE 10 2007 033 256 A (where it is termed an auxiliary drive), is provided.

An exemplary embodiment of the invention will now be explained in greater detail with reference to the accompanying drawings. Mutually corresponding items or elements are provided with the same reference characters in all the figures.

The exemplary embodiment should not be construed as a limitation of the invention. On the contrary, additions and modifications are indeed possible within the scope of the present disclosure, especially such additions and modifications which, for example, as a result of combinations or modifications of individual features or method steps described in conjunction with the general or specific description part and contained in the claims and/or the drawings, can be comprehended by persons skilled in the art as far as the achievement of the object is concerned and, as a result of combinable features, lead to a novel device or to novel method steps or sequences of method steps.

DETAILED DESCRIPTION OF PREFERRED EMBODIMENTS

Figure 1:
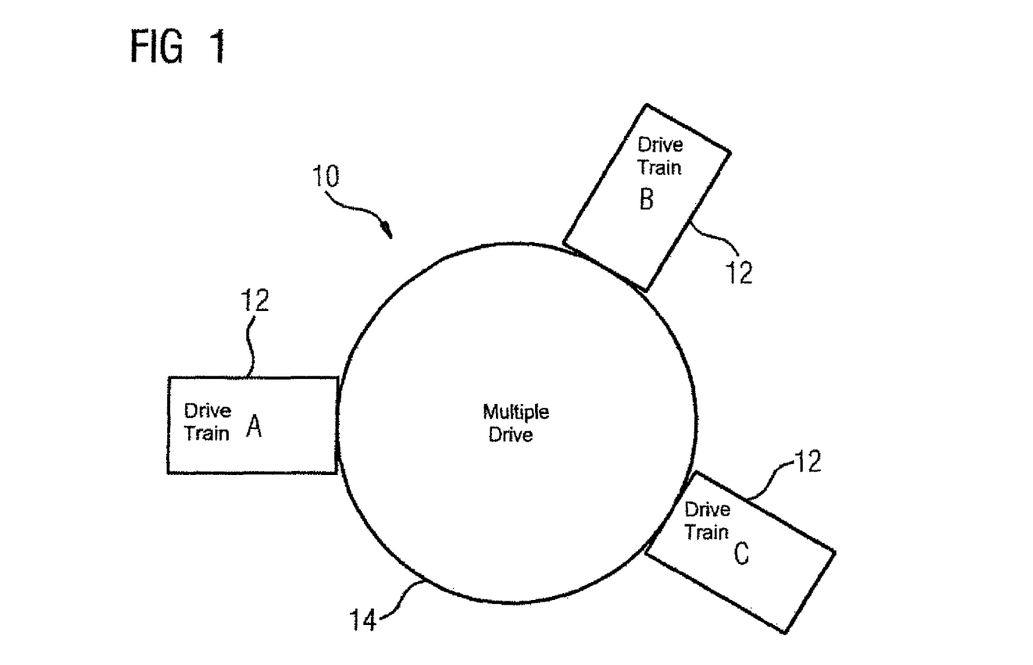
FIG. 1 shows a multiple drive for a heavy load application, having individual drive trains comprised by the multiple drive.

FIG. 1 schematically illustrates, in greatly simplified form, a multiple drive 10 for a heavy load application, and the multiple drive 10 comprises a plurality of drive trains 12. The heavy load application is, by way of example, a vertical mill of which, in the case of the viewing direction (plan) selected for the illustration, the grinding table 14 caused to rotate by means of the multiple drive 10 is shown.

Figure 2:
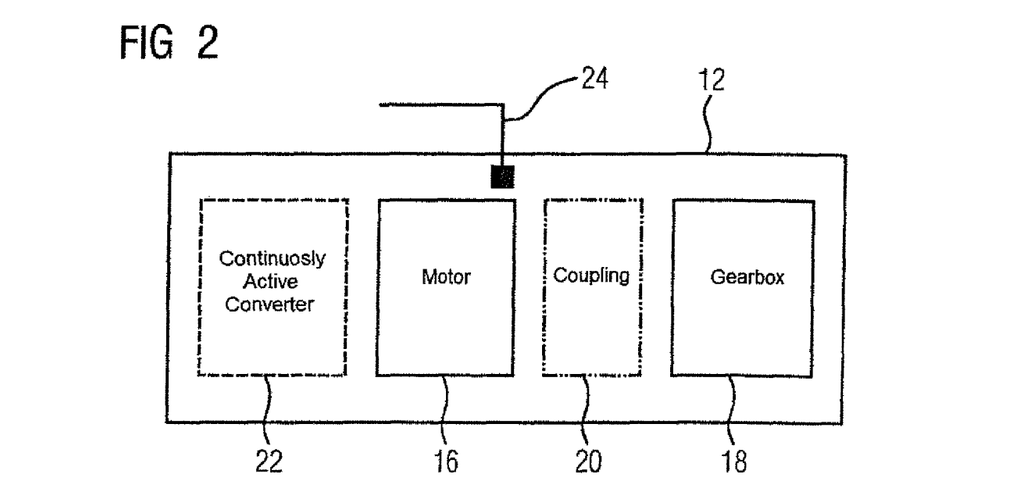
FIG. 2 shows a drive train.

FIG. 2 schematically illustrates—likewise in greatly simplified form—that each drive train 12 of a multiple drive 10 comprises a motor 16, namely an electric motor, and a gearbox 18 or a motor 16, a coupling 20 and a gearbox 18. A basically per se known, continuously active converter 22 (main converter) by means of which the motor 16 can be pre-assigned a startup profile, for example, is optionally connected upstream of the motor 16, e.g. for one of the drive trains 12 of the multiple drive 10, individual drive trains 12 or all the drive trains 12. The drive train 12 is optionally assigned at least one sensor system 24 in the form of a sensor or a plurality of sensors.

Figure 3:
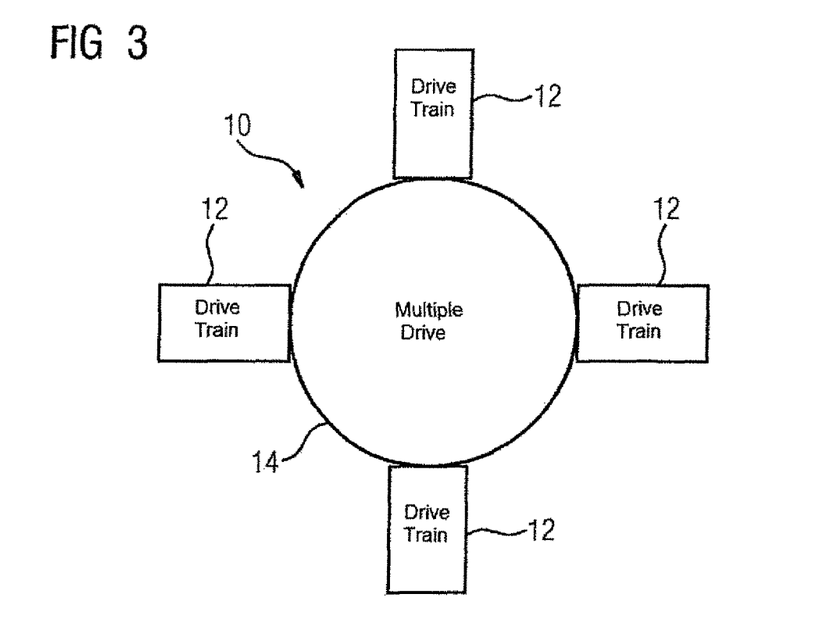
FIG. 3 and FIG. 4 show other configurations of a multiple drive according to FIG. 1.
Figure 4:
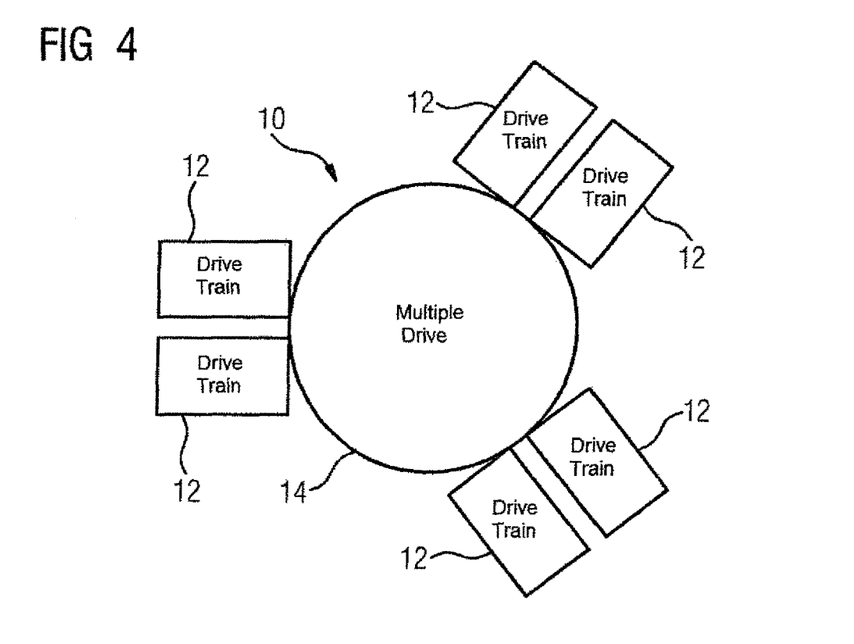

FIG. 1 shows an asymmetrical arrangement of the drive trains 12. FIG. 3 and FIG. 4 likewise show a multiple drive 10 for a heavy load application, namely for a heavy load application in the form of a vertical mill by way of example. The arrangement of the drive trains 12 shown in FIG. 3 is termed a symmetrical arrangement. The arrangement shown in FIG. 4 is termed a parallel arrangement of the drive trains 12.

Each drive train 12 is self-evidently coupled in a suitable manner to the heavy load application, here the grinding table 14, in that, for example, an output-side toothed wheel of the gearbox 18 (FIG. 2) of the drive train 12 engages in a toothed ring (not shown) running around the outer perimeter of the table 14.

Heavy load applications such as a vertical mill, for example, can basically be driven by means of an individual electric motor with or without an upstream frequency converter. In a per se known manner, the use of a frequency converter allows a frequency ramp to be used for starting without producing strong overcurrent peaks and without generating undesirably high or low torques. On the other hand, using an electric motor without upstream frequency converter is known to place a considerable load on the electrical supply system because of the starting currents then required, or it is even possible that the energy supplier will be unable to provide the required starting current at all. The use of a frequency converter or other current limiting functional units (e.g. soft starters, starting resistors and the like) reduces the starting current, avoids the otherwise resulting load on the supply system and ensures that the starting current required can also normally be provided. However, a frequency converter, specifically a frequency converter for power ranges of the kind required in heavy load applications, is very expensive. In order to obviate the need for a frequency converter, in the case of drives for heavy load applications without frequency converter, a special starter (e.g. soft starter or liquid resistance starter) is therefore used for the startup process. However, such a starter for its part involves new limitations, e.g. in that is heats up or can only produce a small torque. In the case of heating, startup cannot take place several times in succession. Therefore, if a plurality of startup processes are required to start up the heavy load application, it will in each case be necessary to wait until the starter can be used again. This results in undesirable and costly waiting times. In the case of a small torque, the startup process may not be possible at all.

It is therefore proposed here to use a multiple drive 10, e.g. in a configuration as shown in FIGS. 1, 2 and 4, as the drive of the heavy load application. To avoid high starting currents when starting the respective heavy load application by means of a multiple drive 10, it is provided that, for starting up the heavy load application, individual drive trains 12 can be successively activated and that, for starting up the heavy load application, individual drive trains 12 are successively activated.

Figure 5:
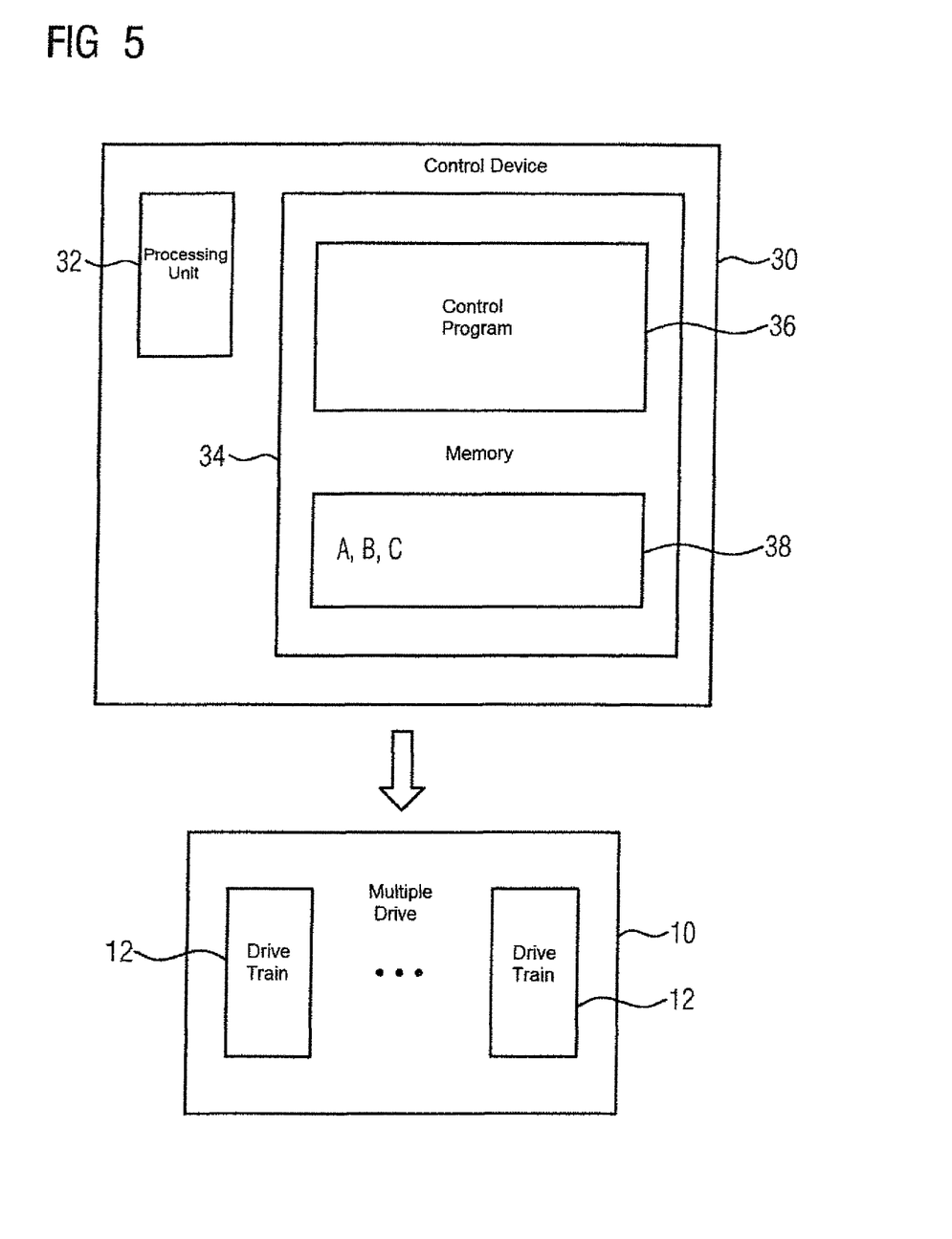
FIG. 5 shows a control device for controlling the multiple drive and the drive trains comprised thereby.

To successively activate individual or a plurality of drive trains 12, different but basically also combinable activation strategies are basically possible. For this, a control device 30 shown in schematically simplified form in FIG. 5 is provided which is designed and set up to indirectly or directly control the multiple drive 10 and to activate the drive trains 12 comprised thereby.

The control device 30 comprises in a per se known manner, for example, a processing unit 32 in the form of or in the manner of a microprocessor, and a memory 34 into which a control program 36 can be loaded and is loaded during operation of the control device 30. The control device 30 and the control program 36 are means of executing/applying the activation strategies described in the following. Each method step is carried out automatically by the control device 30 and under control of the control program 36 even if this is not alluded to in the following.

A first activation strategy for successively activating individual drive trains 12 consists in that, under control of the control program 36, initially only one of the drive trains 12 is activated during startup of the heavy load application. The drive train 12 to be activated is predefined or predefinable by the activation strategy. By means of the one activated drive train 12, the heavy load application is brought up to a predefined or predefinable speed, e.g. an idling speed, and when the respective speed is attained—termed the initial speed for short in the following—all the drive trains 12 or further drive trains 12 are activated according to the first activation strategy. Alternatively or additionally, the current flow to the respectively activated drive train 12 can be taken into consideration. As is well known, especially in the case of motors 16 designed as squirrel cages, the starting current already decreases markedly just before a respective nominal speed is attained. According to an activation strategy based on monitoring of the starting current, a predefined or predefinable drive train 12 is first activated by the activation strategy and its starting current monitored. If the monitored starting current falls below a predefined or predefinable threshold value, all the drive trains 12 or further drive trains 12 are activated according to the activation strategy.

A second activation strategy consists in that individual or a plurality of drive trains 12 are successively activated according to a predefined or predefinable activation scheme 38. For example, for this purpose each drive train 12 is assigned a number or other ordering criterion (represented symbolically as "A", "B" and "C" in FIG. 1). The activation scheme 38 (represented symbolically as "A, B, C" in FIG. 5) is stored in the memory 34 of the control device 30 or in some other manner suitable and achievable for the control device 30. The use of the activation scheme 38 by the control device 30 and under control of the control program 36 initially causes the drive train 12 to which the ordering criterion specified first in the activation scheme 38 is assigned to be activated, i.e. the drive train 12 having the ordering criterion "A" in the example shown. Then the drive train 12 to which the ordering criterion specified second in the activation scheme 38 is assigned is activated (instead of the previously activated drive train 12 or in addition to the previously activated drive train 12), and so on until eventually all the drive trains 12 of the multiple drive 10 are activated.

The activation scheme 38 can, for example—in the case of a multiple drive 10 having three drive trains—also be defined in the following form: ["A--", "-B-", "A-C", "ABC"]. This is intended to represent an activation scheme 38 in which initially one of the drive trains 12 ("A") is activated, in which then another drive train 12 ("B") is activated instead of the first activated drive train 12 ("A"), in which then the first activated drive train 12 ("A") is re-activated together with a hitherto not yet activated drive train 12 ("C"), and in which finally all the drive trains 12 ("A", "B", "C") are activated.

The process advances from one stage of the activation scheme 38 to the next stage of the activation scheme 38, for example, on the basis of a speed measurement. When a predefined or predefinable percentage of the initial speed is attained, the process switches over to the next stage of the activation scheme 38. Accordingly, in the case of two-stage activation scheme 38, the first stage of the activation scheme 38 is active until 50% of the initial speed is reached and the second stage of the activation scheme 38 correspondingly until 100% of the initial speed is reached. The same applies to an activation scheme 38 having more than two stages. The distribution of the initial speed percentages can also increase in a nonlinear manner, because the initial acceleration of the heavy load application requires the largest energy input, so that in the case of a two-stage activation scheme 38, for example, the first stage of the activation scheme 38 is active until 30% of the initial speed is reached and the second stage of the activation scheme 38 is correspondingly active until 100% of the initial speed is reached. Additionally or alternatively, time-, temperature- and/or current-intensity-dependent switchover from one stage of the activation scheme 38 to the next stage is also possible.

Optionally in the case of repeated startup of the heavy load application, different activation schemes 38 can also be used in each case. For this purpose, at each startup of the heavy load application, the control device 30 stores information as to which activation scheme 38 was used in each case so that, for the next startup of the heavy load application, another activation scheme 38 is used, e.g. the next activation scheme 38 in the sequence of activation schemes 38, until, after the last activation scheme 38 in the sequence of activation schemes 38 is used, the first activation scheme 38 is used again. This prevents the same drive train 12 from always having to provide the initial acceleration of the heavy load application at startup of the heavy load application. The load is therefore spread by using different activation schemes 38. By way of example and on the basis of the example already used above, such activation schemes 38 applied to some extent in a rotating manner can be formulated as follows: [["A--", "-B-", "A-C", "ABC"]; ["-B-", "--C", "AB-", "ABC"]; ["--C", "A--" "-BC", "ABC"]].

As an alternative to such an e.g. rotating application of a plurality of activation schemes 38, "random" activation of the drive trains 12 is also possible. The random selection of the particular drive train 12 to be activated is performed automatically by the control device 30, e.g. using a so-called random generator. If in the case of random selection a drive train 12 is selected whose temperature (or whose temperature-proportional measured value; see below) is already above a predefined or predefinable limit value, the drive train 12 selected is not activated and a new drive train 12 is selected instead on a random basis.

Additionally or alternatively to using one or more activation schemes 38, individual drive trains 12 can also be activated on the basis of at least one measured value acquired in respect of at least one drive train 12. In the explanation of the diagram in FIG. 2, a sensor system 24 shown there was mentioned. The sensor system 24 comprises, for example, a temperature sensor and the sensor system 24 accordingly provides a temperature measurement, e.g. a temperature measurement taken on the motor 16. A respective temperature of the drive train 12 or of the motor 16 comprised thereby is a suitable criterion for switching from one drive train 12 to another drive train 12 likewise comprised by the multiple drive 10. This prevents one of the drive trains 12 from overheating during startup of the heavy load application. Aside from using a temperature measurement or in addition to using a temperature measurement, it is also possible to use a measured value that is indicative of the temperature of the drive train 12. Thus it is also conceivable, for example, to measure a respective slippage of the drive train 12 by means of the sensor system 24 and to determine an associated temperature on this basis (the temperature of a fluid coupling is known to be slip-dependent). In the following, such or similar measured values will be collectively termed a measure for a temperature of the respective drive trains 12 or a temperature-proportional measured value.

An activation strategy based thereon provides that, for the drive trains 12 comprised by the multiple drive 10, at least one temperature-proportional measured value is acquired in each case and that the drive trains 12 successively activated during startup of the heavy load application are selected on the basis of the temperature-proportional measured value, e.g. by first activating the drive train 12 having the lowest temperature-proportional measured value. This ensures that only a drive train 12 not loaded or lightly loaded previously is activated in each case. As a result, the loads placed on the drive trains 12 in the multiple drive are evenly distributed.

An activation strategy based on a temperature-proportional measured value can also be used to select one of a plurality of activation schemes 38, e.g. such that an activation scheme 38 is selected according to a temperature-proportional measured value of a drive train 12 activated in the first stage of the respective activation scheme 38.

As a further or augmented activation strategy, automatic deactivation of a drive train 12 or of individual drive trains 12 and/or automatic activation of a drive train 12 or of individual drive trains 12 can take place by means of the control device 30 and under control of the control program 36 on the basis of temperature-proportional measured values. The result of such an activation strategy is, for example, that during startup of the heavy load application the drive train 12 having the lowest temperature-proportional measured value is activated first, that during startup a temperature-proportional measured value of the or each already activated drive train 12 is monitored, that an already activated drive train 12 is deactivated if the temperature-proportional measured value thereof exceeds a predefined or predefinable limit value, and that instead of the thus deactivated drive train 12 the drive train 12 of the multiple drive 10 having the lowest temperature-proportional measured value is activated.

The on/off switching of a drive train 12 on the basis of a temperature-proportional measured value can also still be used after startup of the heavy load application, i.e. during ongoing operation. In a similar manner, during ongoing operation a drive train 12 can be deactivated cyclically according to a predefined or predefinable scheme and an inactive drive train 12 can be activated in its place.

Although the invention has been described and illustrated in detail by the exemplary embodiment, the invention is not limited by the example(s) disclosed and other variations may be inferred therefrom by persons skilled in the art without departing from the scope of protection sought for the invention.

Individual salient aspects of the description presented here may be summarized as follows: specified is a multiple drive 10 for a heavy load application and a method for operating such a multiple drive 10, wherein the multiple drive 10 comprises a plurality of drive trains 12 and wherein, during startup of the heavy load application, individual drive trains 12 are successively activatable or activated as the case may be. During startup of the heavy load application, as part of the successive activation/activatability, initially only one of the drive trains 12 or a group of drive trains 12 is activated, so that a defined starting sequence results and the initial starting current is limited. In the case of any required repeated startup of the heavy load application, a drive train 12 or at least one drive train 12 other than the drive train(s) activated during the previous startup is initially activated, so that a defined starting sequence likewise results and a new startup process can be initiated immediately or without any appreciable waiting time.

The invention claimed is:

1. A multiple drive for a heavy load application, comprising
   a plurality of drive trains,
   a control device controlling the drive trains, and
   a sensor system configured to measure at least one temperature-proportional value for the drive trains of the multiple drive,
   wherein the control device controls individual ones of the plurality of drive trains automatically according to an activation scheme on the basis of the at least one measured temperature-proportional value, and uses a different activation scheme when the heavy load application is subsequently started again with a new control loop.

2. The multiple drive of claim 1, wherein the drive trains include a motor and a coupling operably connected to the motor and configured as a fluid coupling.

3. A method for operating a multiple drive for a heavy load application, comprising:
   automatically controlling with a control device individual drive trains of the multiple drive according to an activation scheme stored in a memory of the control device;
   measuring at least one temperature-proportional value for the drive trains of the multiple drive;
   selecting one or more of the drive trains to be activated on the basis of the measured temperature-proportional value; and
   using a different activation scheme when the heavy load application is subsequently started again with a new control loop.

4. The method of claim 3, comprising the further steps of, when the heavy load application is started with a first control loop of the activation scheme, initially activating only one of the drive trains, bringing the heavy load application to an initial speed by the one activated drive train, and thereafter successively activating with subsequent control loops all the drive trains or further drive trains when the initial speed is attained.

5. The method of claim 4, wherein the initial speed is an idling speed.

6. A computer program comprising program code stored on a non-transitory storage medium, which program code, when loaded into a memory of a control device for controlling a multiple drive for a heavy load application and executed by the control device, causes the control device to perform the steps of:
   automatically controlling individual drive trains of the multiple drive according to an activation scheme stored in a memory of the control device;
   measuring at least one temperature-proportional value for the drive trains of the multiple drive;
   selecting one or more of the drive trains to be activated on the basis of the measured temperature-proportional value; and
   using a different activation scheme when the heavy load application is subsequently started again with a new control loop.

7. The computer program of claim 6, further causing the control device, when the heavy load application is started with a first control loop of the activation scheme, to perform the steps of initially activating only one of the drive trains, bringing the heavy load application to an initial speed by the one activated drive train, and thereafter successively activating with subsequent control loops all the drive trains or further drive trains when the initial speed is attained.

8. The computer program of claim 7, wherein the initial speed is an idling speed.

9. A control device for controlling a multiple drive for a heavy load application, comprising:
   a processing unit;
   a memory; and
   a computer program embodied as a control program on a non-transitory medium, which control program, when loaded into the memory and executed by the processing unit during operation of the control device causes the processing unit to perform the steps of:

automatically controlling individual drive trains of the multiple drive according to an activation scheme stored in a memory of the control device;

measuring at least one temperature-proportional value for the drive trains of the multiple drive;

selecting one or more of the drive trains to be activated on the basis of the measured temperature-proportional value; and using a different activation scheme when-the heavy load application is subsequently started again with a new control loop.

10. The control device of claim 9, wherein the computer program causes the processing unit to perform, when the heavy load application is started with a first control loop of the activation scheme, as part of the controlling, the steps of initially activating only one of the drive trains, bringing the heavy load application to an initial speed by the one drive train, and thereafter successively activating with subsequent control loops all the drive trains or further drive trains when the initial speed is attained.

11. A vertical mill, comprising:

a multiple drive for a heavy load application, said multiple drive comprising a plurality of drive trains, a control device controlling the drive trains, and a sensor system configured to measure at least one temperature-proportional value for the drive trains of the multiple drive wherein the control device has a processing unit, a memory and a computer program embodied as a control program in a non-transitory computer readable medium, wherein the computer program, when loaded into the memory and executed by the processing unit during operation of the control device causes the processing unit to perform the steps of controlling individual ones of the plurality of drive trains automatically according to the activation scheme, selecting one or more of the drive trains to be activated on the basis of the measured temperature-proportional value; controlling the heavy load application using a different activation scheme when the heavy load application is subsequently started again with a new control loop.

12. The vertical mill of claim 11, wherein the drive trains include a motor and a coupling operably connected to the motor and configured as a fluid coupling.

13. A vertical mill, comprising:

a multiple drive for a heavy load application, said multiple drive comprising a plurality of drive trains and a control device controlling the drive trains, wherein the control device has a processing unit, a memory and a computer program embodied as a control program in a non-transitory computer readable medium, wherein the computer program, when loaded into the memory and executed by the processing unit during operation of the control device causes the processing unit to perform the steps of controlling individual ones of the plurality of drive trains according to the activation scheme, wherein the control device controls the heavy load application using a different activation scheme when the-heavy load application is subsequently started again, wherein when the heavy load application is started with a first control loop of the activation scheme, initially only one of the drive trains is activated, which brings the heavy load application to an initial speed, and thereafter all the drive trains or further drive trains are successively activated with one or more control loops of the activation scheme when the initial speed is attained.

* * * * *